R. D. GOULD.
CONNECTING PIPE FOR FAUCETS.
APPLICATION FILED AUG. 25, 1911.

1,133,954.

Patented Mar. 30, 1915.

Witnesses
Cora K. Handy
Jennie M. Fallin

Inventor
R. D. Gould.
By
Attorney

UNITED STATES PATENT OFFICE.

ROLAND D. GOULD, OF HOOD RIVER, OREGON.

CONNECTING-PIPE FOR FAUCETS.

1,133,954.  Specification of Letters Patent.  Patented Mar. 30, 1915.

Application filed August 25, 1911. Serial No. 646,043.

*To all whom it may concern:*

Be it known that I, ROLAND D. GOULD, citizen of the United States, residing at Hood River, in the county of Hood River and State of Oregon, have invented certain new and useful Improvements in Connecting-Pipes for Faucets, of which the following is a specification.

This invention relates to pipe connectors and has for its object the provision of a comparatively simple and thoroughly efficient device of this character especially designed for connecting the hot and cold water faucets of kitchen sinks and the like and by means of which either hot or cold water, or both, may be discharged into the sink at will.

A further object is to provide a connector including a pipe having an intermediate discharge nipple and provided at its opposite ends with slip joint union couplings, whereby the pipe may be quickly and conveniently connected with faucets having plain bibs without the necessity of threading or otherwise altering the construction thereof.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
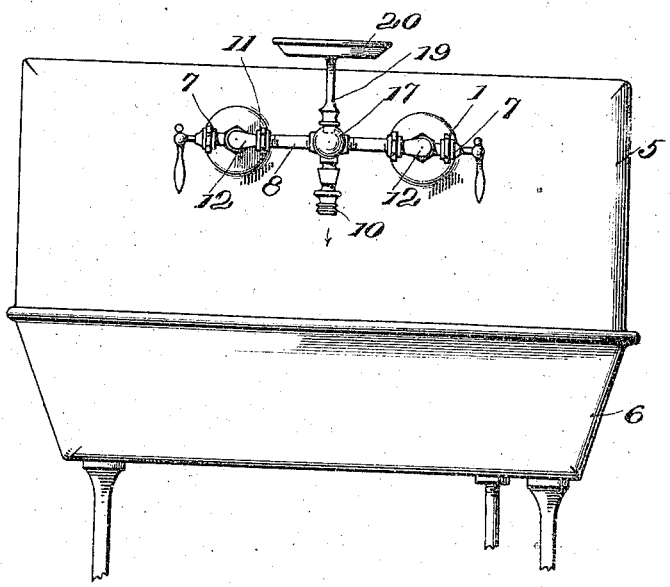
Figure 2:
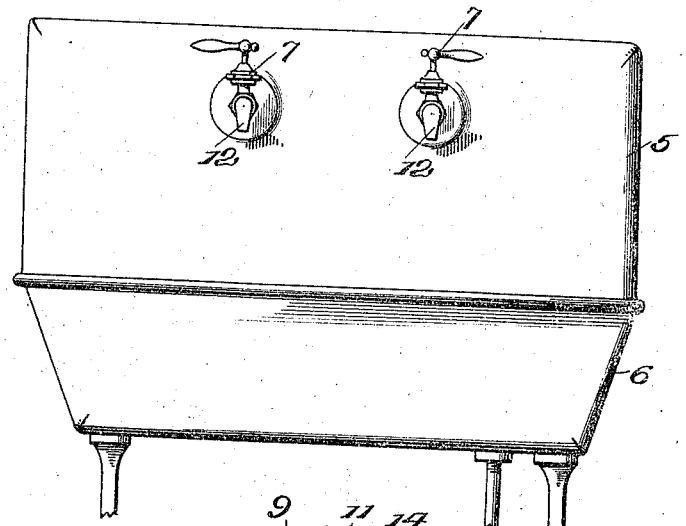
Figure 3:
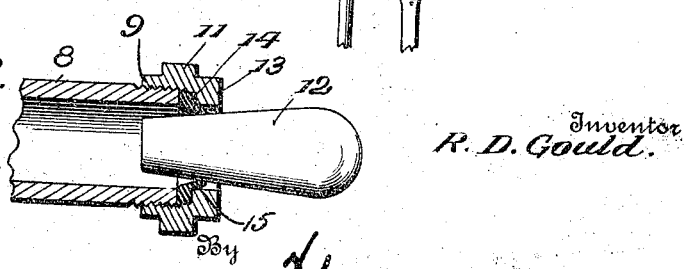

For a full understanding of the invention and the merits thereof, reference is to be had to the following description and accompanying drawing, in which:

Figure 1 is a front elevation of a pipe connector constructed in accordance with the present invention, showing the manner of connecting the faucets of a kitchen sink; Fig. 2 is a similar view, with the connector detached; Fig. 3 is an enlarged fragmentary view of one of the ends of the pipe connector and as a connected faucet bib.

Corresponding and like parts are referred to in the following description and indicated in all the views of the drawing by the same reference characters.

The improved coupling forming the subject matter of the present invention is principally designed for connecting the hot and cold water faucets of kitchen sinks and the like, and by way of illustration is shown applied to a sink of the ordinary construction in which 5 designates the wash board, 6 the sink and 7 the hot and cold water faucets secured to the wash board in the usual manner and having plain or smooth bibs, as shown.

The device comprises a pipe section 8 having its opposite ends threaded at 9 and its central portion provided with a depending discharge nipple 10, through which either hot or cold water, or both, may be drawn from the faucets 7 and discharged into the sink 6, when desired. Threaded on the terminals 9 of the pipe, are union nuts 11 adapted to fit over the smooth bibs 12 of the faucets, when the latter are turned to a substantially horizontal position, said union nuts being provided at their outer ends with annular shoulders 13 which form abutments for yieldable gaskets 14. The gaskets 14 are each preferably formed of rubber and are provided with tapered exterior walls 15. The gaskets 14 snugly engage the exterior walls of the bibs 12 of the faucets so as to prevent leakage between the parts, the union nuts 11 being adjustable longitudinally of the connecting pipe 8 so as to form in effect a slip joint coupling and thus permit the pipe section 8 to be readily connected to or disconnected from the faucets without the necessity of threading or otherwise altering the construction thereof.

The pipe section 8 is provided with a centrally substantially spherical enlargement 17 having a threaded opening formed therein for the reception of the adjacent end of a bracket 19, the latter being secured to a tray 20 adapted to receive soap and the like.

In connecting the faucets 7, the latter are rotated until the bibs 12 thereof assume a horizontal position, after which the pipe section 8 is interposed between the bibs of the faucets and the union nuts 11 rotated so as to engage the threads 9, thus securing the several parts in assembled position, and in which position, either hot or cold water, or both, may be drawn at will by rotating the handles of the faucets in the usual manner. By rotating the union nuts 11 in the reverse direction, the connecting pipe 8 may be removed and the faucets 7 turned until the bibs thereof assume a vertical position, thus permitting the faucets to be used in the ordinary manner.

The device is extremely simple in construction and may be readily connected either to plain or threaded bib faucets without changing the construction thereof, or without requiring specially constructed tools to effect the assemblage of the parts.

It will of course be understood that the connecting pipes may be made in different lengths and that when the device is used for connecting faucets having threaded bibs, the union nuts will be correspondingly threaded for engagement therewith.

Having thus described the invention, what is claimed as new is:

1. A coupling adapted for attachment to a tapered faucet bib and including a pipe section having one end threaded, a union nut engaging the threaded end of the pipe section and provided with a terminal shoulder, and a yieldable gasket bearing against the adjacent end of the pipe section and having its exterior wall tapered in a direction opposite to the taper of the bib, said gasket being arranged to extend between the bib and the shoulder of the nut with the exterior tapered wall thereof disposed for frictional engagement by the inner adjacent edges of said shoulder.

2. An integral coupling for detachably uniting horizontally tapered faucet bibs including a pipe section formed with a discharge nipple and having its opposite ends threaded, union nuts engaging the threaded ends of the pipe section and provided with terminal shoulders, and yieldable gaskets bearing against the ends of the pipe section and having their exterior walls tapered in a direction opposite to the taper of the bibs, said gaskets being arranged to extend between the bibs and the shoulders of the nuts with the exterior tapered walls thereof disposed for frictional engagement by the inner adjacent edges of said shoulders.

In testimony whereof, I affix my signature in presence of two witnesses.

ROLAND D. GOULD. [L. S.]

Witnesses:
 CORA I. WEBER,
 A. J. DERBY.